(12) United States Patent
Coleman

(10) Patent No.: US 6,850,610 B1
(45) Date of Patent: Feb. 1, 2005

(54) TELECOMMUNICATIONS DEVICE AND METHOD FOR PROVIDING INFORMATION DURING A CALL WAITING CONDITION

(75) Inventor: Mark A. Coleman, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 477 days.

(21) Appl. No.: 09/836,825

(22) Filed: Apr. 17, 2001

(51) Int. Cl.[7] .............................. H04M 3/42; H04M 3/58
(52) U.S. Cl. .............................. 379/215.01; 379/88.22; 379/393; 455/414.1
(58) Field of Search ..................... 379/88.22, 215.01, 379/393; 455/414.1

(56) References Cited

U.S. PATENT DOCUMENTS

| | | | |
|---|---|---|---|
| 4,661,975 A | 4/1987 | Brecher | 379/215.01 |
| 4,785,408 A | 11/1988 | Britton et al. | 704/270 |
| 5,007,076 A | 4/1991 | Blakley | 379/88.21 |
| 5,159,626 A | * 10/1992 | Baum et al. | 379/88.22 |
| 5,309,512 A | 5/1994 | Blackmon et al. | 379/215.01 |
| 5,557,658 A | * 9/1996 | Gregorek et al. | 379/88.25 |
| 5,680,447 A | 10/1997 | Diamond et al. | 379/215.01 |
| 5,862,212 A | 1/1999 | Mathews | 379/386 |

FOREIGN PATENT DOCUMENTS

| | | | |
|---|---|---|---|
| EP | 1049312 A2 | 11/2000 | H04M/1/725 |
| WO | WO 00/38340 | 6/2000 | H04B/1/40 |

OTHER PUBLICATIONS

*Sprint PCS Phone—Samsung Uproar*, m31.sprintpcs.com/mymusic/uproar.html, 2000.

* cited by examiner

*Primary Examiner*—Harry S. Hong
(74) *Attorney, Agent, or Firm*—Cantor Colburn LLP

(57) ABSTRACT

A telecommunications device and a method for providing information to a party placed on hold during a call waiting condition. The telecommunications device includes a memory unit, and a call waiting module in communication with the memory unit. The call waiting module is for transmitting information stored in the memory unit to the party when the call waiting condition is detected.

37 Claims, 4 Drawing Sheets

US 6,850,610 B1

TELECOMMUNICATIONS DEVICE AND METHOD FOR PROVIDING INFORMATION DURING A CALL WAITING CONDITION

BACKGROUND OF INVENTION

1. Field of Invention

The present invention relates generally to telecommunications and, more particularly, to devices and methods for providing information during a call waiting condition.

2. Description of the Background

Call waiting is a telephone service feature that alerts a party already engaged in conversation that a new incoming call has arrived. The notified party can choose to ignore the alerting signal or respond with a signal, such as pressing the "Flash" key on a standard touch-tone telephone, requesting that the existing connection be placed on hold and the incoming call be connected. A second signal from the alerted party, such as pressing the "Flash" key, causes the original connection to be reestablished and the second incoming call to be dropped.

While on hold during the time period that the alerted party is connected to the new caller, the original party typically hears nothing but silence. This silence often confuses callers, causing them to believe they have been disconnected, rather than merely placed on hold. As a result, many confused callers hang up. This results not only in dissatisfied customers for telephone service providers, but also reduced revenue for the telephone service providers because of the prematurely terminated calls.

Accordingly, there exists a need for a manner in which to assure callers placed on hold during a call waiting condition that they are still connected.

BRIEF SUMMARY OF THE INVENTION

The present invention is directed to a telecommunications device and a method for providing information to a party placed on hold during a call waiting condition. According to one embodiment, the telecommunications device includes a memory unit and a call waiting module in communication with the memory unit. The memory unit may store the information to be transmitted to the party placed on hold during the call waiting condition. The call waiting module may transmit the information stored in the memory unit to the party placed on hold when the call waiting condition is detected. The call waiting condition may be detected by detection of both (i) a call waiting alert, such as an audible tone from the telephone network alerting the user of the telecommunications device that a second party has placed an incoming call, and (ii) activation of the call waiting service by the user of the telecommunications device. The call waiting module may cease transmitting information to the party placed on hold when the call waiting condition is terminated.

The telecommunications device may be, for example, a wireless telephone or a wireline telephone. The call waiting module may be implemented as computer instruction code to be executed by, for example, a digital signal processor (DSP) or microprocessor of the telecommunications device. In addition, the information to be played to the party placed on hold during the call waiting condition may be downloaded to the telecommunications device, such as from the Internet. According to another embodiment, the information may be a message recorded by the user of the telecommunications device.

In addition, the method of the present invention, according to one embodiment, may include detecting the call waiting condition, and transmitting the information to the party when the call waiting condition is detected.

The present invention solves problems experienced in the prior art by providing information to a party placed on hold during a call waiting condition. Consequently, the on-hold party may experience something other than silence, thereby enhancing the likelihood that the on-hold party will stay on the call. Moreover, the information played for the on-hold party may be tailored by the user of the telecommunications device according to personal preferences. These and other benefits of the present invention will be apparent in view of the detailed description to follow.

BRIEF DESCRIPTION OF THE DRAWINGS

The present invention is described in conjunction with the following figures, wherein.

DETAILED DESCRIPTION OF THE INVENTION

It is to be understood that the figures and descriptions of the present invention have been simplified to illustrate elements that are relevant for a clear understanding of the present invention while eliminating, for purposes of clarity, other elements of a conventional telecommunications device. For example, specific operating system details and modules contained in the processing units of the devices are not shown. Those of ordinary skill in the art, however, will recognize that these and other elements may be desirable. Because such elements are well known in the art, and because they do not facilitate a better understanding of the present invention, a discussion of such elements is not provided herein.

The term "communication" is used synonymously herein with the term "call" to include all messages or calls that may be exchanged between a calling party (i.e., a party that initiates a communication) and a called party (i.e., a party that receives an communication), including voice, data and video messages.

Figure 1:
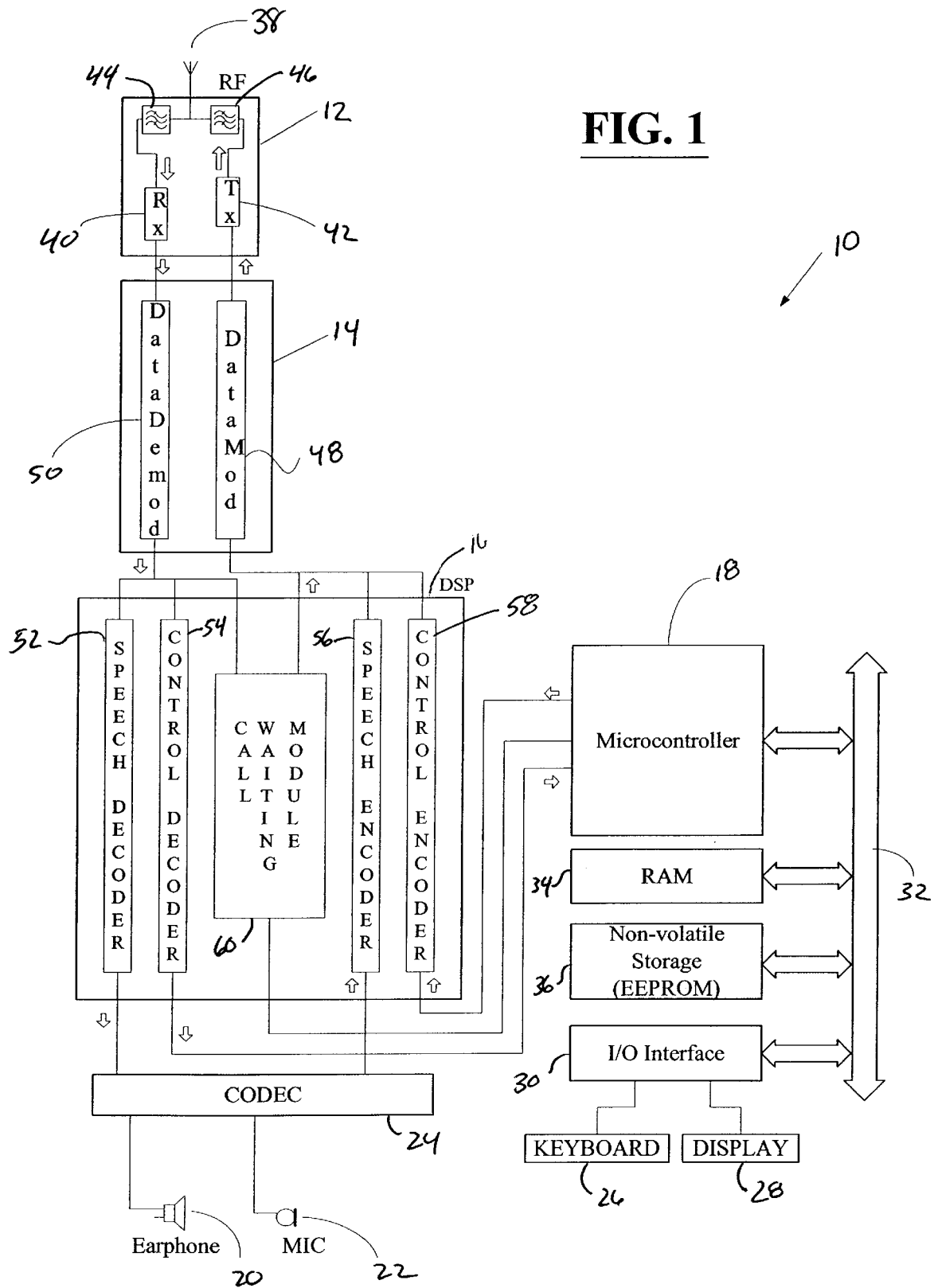
FIG. 1 is a block diagram of a telecommunications device according to one embodiment of the present invention.

FIG. 1 is a diagram of a wireless telephone 10 according to one embodiment of the present invention. The wireless telephone 10 may be, for example, a digital wireless telephone (DWT), as illustrated in FIG. 1, that can function in a digital wireless communication system (e.g., a TDMA system or a CDMA system).

The DWT 10 illustrated in FIG. 1 includes an RF transceiver unit 12, a modulator-demodulator unit 14, a digital signal processor (DSP) 16, and a microcontroller 18. The DWT 10 also includes an earphone 20 and a microphone 22 connected to the DSP 16 via a CODEC (coder-decoder) unit 24. In addition, the DWT 10 includes a keyboard 26 and a display unit 28. The keyboard 26 and the display unit 28 may interface with the microcontroller 18 via an I/O interface 30.

The I/O interface 30 may communicate with the microcontroller 18 via a bi-directional bus 32. The DWT 10 may also include memory units such as, for example, a RAM unit 34 and a non-volatile memory unit 36. The memory units 34, 36 may be in communication with the microcontroller 18 via the bi-directional data bus 32. The non-volatile memory unit 36 may be, for example, an EEPROM. According to other embodiments, the DWT 10 may include other types of memory units such as, for example, ROM or flash memory.

The RF transceiver unit 12 may include an RF antenna 38, an RF receiver amplifier 40, and an RF transmitter amplifier 42. The RF transceiver unit 12 may also include a pair of band pass filters, a receiver filter 44 and a transmitter filter 46, to filter out signals outside of the receive and transmit frequency ranges respectively. The RF transceiver unit 12 may establish a telephone communication over one or more RF channels.

The modulator-demodulator unit 14 may include a data modulator 48 and a data demodulator 50. The data demodulator 50 may demodulate voice and control channel bits received by the RF transceiver unit 12, as described further hereinbelow. The data modulator 48 may modulate voice and control channel bits to be transmitted by the RF transceiver unit 14, as discussed further hereinbelow.

The microcontroller 18 may include a number of logic units or circuit elements (not shown) such as a bus control logic unit and a control information processing unit, as well as one or more temporary storage registers or buffers. Among other things, the microcontroller 18 may interpret keyboard entries entered on the keyboard 26 and received via the I/O interface 30. Further, the microcontroller 18 may control the display of information on the display 28 via the I/O interface 30.

The DSP 16 may include a number of modules, such as a speech decoder module 52, a control decoder module 54, a speech encoder module 56, a control encoder module 58, and a call waiting module 60. The modules 52, 54, 56, 58, 60 may be implemented using any type of computer instruction type, such as microcode, and may be stored in, for example, one of the memory units 34, 36, or can be configured into the logic of the DSP 16.

The decoder units, i.e., the speech decoder module 52 and the control decoder module 54, may receive demodulated bit streams from the data demodulator 50. The speech decoder module 52 may supply its output to the CODEC unit 24, and the control decoder module 54 may supply its output to the microcontroller 18 for further processing. The encoder units, i.e., the speech encoder module 56 and the control encoder module 58 may supply their respective outputs to the data modulator unit 48. The speech encoder module 56 may receive encoded speech from the CODEC unit 24, and the control encoder unit 58 may receive transmit control information from the microcontroller 18.

The operation of the call waiting module 60 in performing the function of providing information during a call waiting condition is described in more detail hereinbelow.

The DWT 10 enters into a conversation mode when a voice channel is assigned to it by a corresponding base station (not shown) of a digital wireless network (e.g., a network operating under the IS-136 TDMA standard). The analog speech signal from the microphone 12 is first converted into a digital format, e.g., a PCM (pulse code modulation) format, by the CODEC unit 24. The speech encoder module 56 of the DSP 16 may then divide the digital output from the CODEC unit 24 into appropriate time slots and then encode each group of bits. The encoding by the speech encoder 56 may also compress the size of each group of data bits. The DSP 16 may encode via the control encoder 58 any control channel information (including any DTMF audio signaling tones to be transmitted over the digital voice channel) received from the microcontroller 18, and add the encoded control bits to the appropriate group of encoded data bits from the speech encoder 56. The DSP 10 (for example, through the speech encoder module 56) may also add error protection to some of the voice data bits. The combined digital control and voice data bits may then be modulated by the data modulator 48. According to one embodiment, the data modulator 48 is a differential quadrature phase shift keying (DQPSK) modulator. The modulated digital voice and control channel bits may then be transmitted via the RF transceiver unit 12 after amplification by the RF transmitted amplifier 42 and filtering by the transmitter filter 46.

Digital voice and control channel information received by the RF antenna 38 may first be filtered by the receiver filter 44 and amplified by the RF receiver amplifier 40. Thereafter, the data demodulator 50 of the modulator-demodulator unit 14 may demodulate the received voice and control channel bits using, for example, DQPSK demodulation. The DSP 16 receives the demodulated digital voice and control channel bits from the data demodulator 50 and removes the encoding present therein with the speech decoder module 52 and the control decoder module 54 respectively. The decoded control bits may be sent to the microcontroller 18 for further processing. However, the decoded voice bits may be sent to the CODEC unit 24 to reconstruct the analog audio information received through the digital voice bits. The user of the DWT 10 may then listen to the received audio through the earphone 20.

Figure 2:
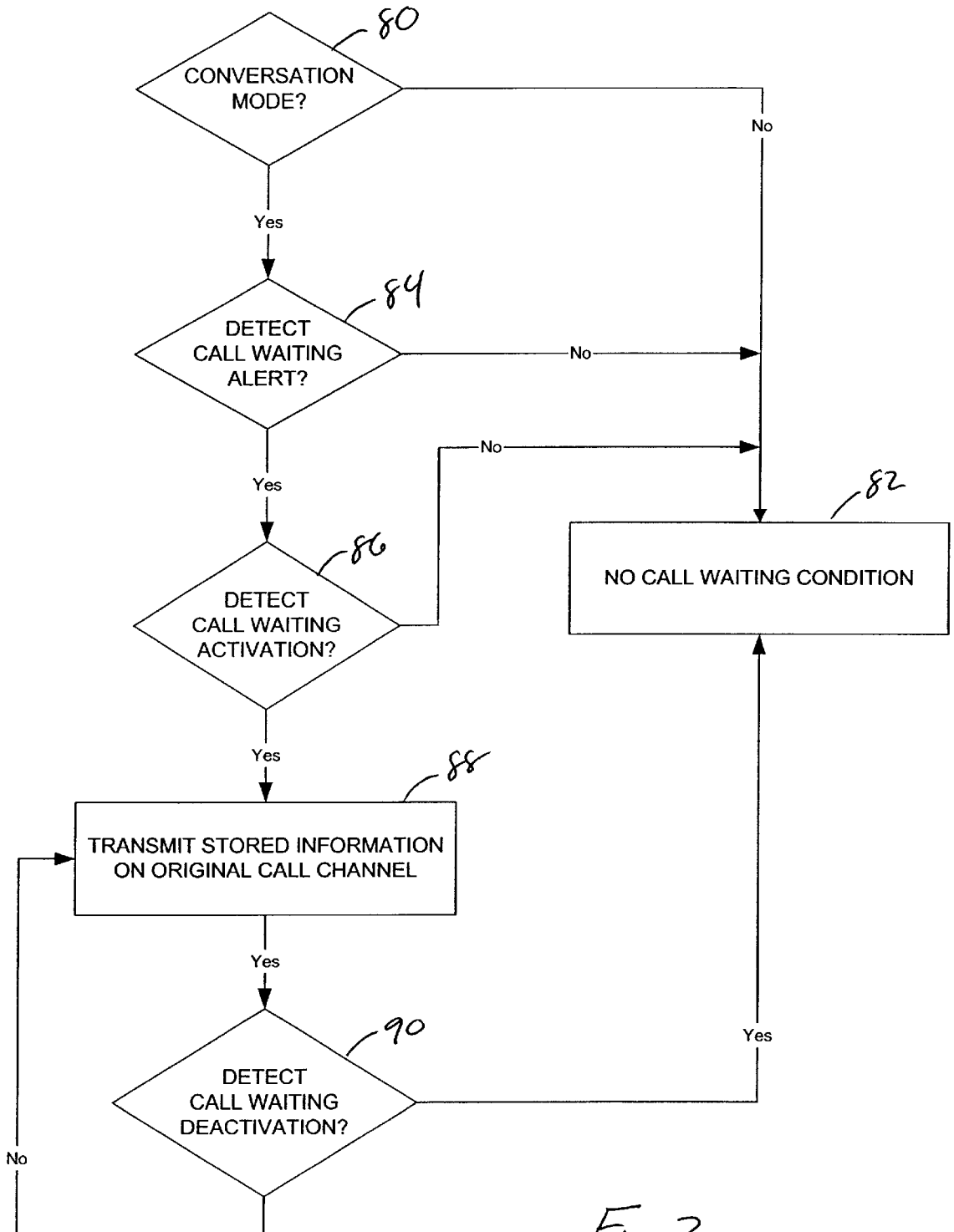
FIG. 2 is a diagram of the process flow through the call waiting module of the telecommunications device of FIG. 1 according to one embodiment of the present invention.

FIG. 2 is a diagram of the process flow through the call waiting module 60 according to one embodiment of the present invention. The process initiates at block 80 where the call waiting module 60 determines if the DWT 10 is in conversation mode. The call waiting module 60 may perform this function by, for example, determining whether a voice channel has been assigned by the wireless network and/or the presence of demodulated data from the data demodulator unit 50.

If the DWT 10 is not in conversation mode, the process advances to block 82, where the call waiting module 60 determines that the DWT 10 is not currently in a call waiting condition. Accordingly, the call waiting module 60 performs no function. If, however, the DWT 10 is in conversation mode, the process advances to block 84, where the call waiting module 60 monitors the incoming data from the data demodulator 50 for a call waiting alert from the wireless network. The alert may be a signal, typically called a subscriber access signal (SAS), from the network indicating that another party is calling the user of the DWT 10 while in the conversation mode. To the user of the DWT 10, the SAS may be an audible tone. The call waiting module 60 may monitor the demodulated data from the data demodulator 50 for a digital signal corresponding to the SAS.

As long as the call waiting module 60 does not detect a call waiting alert at block 82 while in the conversation mode, the DWT 10 is not experiencing a call waiting condition. However, if a call waiting alert is detected, the process advances to block 86 where the call waiting module 60 determines whether the user of the DWT 10 has activated the call waiting service. The call waiting module 60 may detect the activation of the call waiting service by the user of the DWT 10 by detecting the depressing of a key on the keyboard 26 indicative of a command to activate the service.

Typically, such a command may be communicated by depressing, for example, a "SEND", "TRANSMIT", or "FLASH" key on the keyboard 26, depending upon the configuration of the keyboard 26. The microcontroller 18, which is in communication with the keyboard 26 via the I/O interface 30, interprets the depressing of the appropriate key, and communicates its depressing to the call waiting module 60.

As long as the call waiting module 60 does not detect activation of the call waiting service at block 86, the DWT 10 is not experiencing a call waiting condition. However, if the call waiting module 60 detects activation of the call waiting service, the process advances to block 88 where the call waiting module 60 transmits information stored in, for example, one of the memory units 34, 36 to the party with whom the user of the DWT 10 was originally in conversation mode. For example, if Party B places a call to the DWT 10 while in conversation mode on channel 1 with Party A, when the user of the DWT 10 activates the call waiting service, Party B is connected to the DWT 10 via a second channel, for example, channel 2. When this condition occurs, the call waiting module 60 may transmit information stored in a memory unit to Party A via channel 1. The information may be transmitted to Party A, for example, in time slots corresponding to channel 1, and voice/control data transmitted to Party B may be in time slots corresponding to channel 2.

The information sent to Party A may be any type of information that can be stored in encoded form in one of the memory units 34, 36 for transmission via a wireless network. For example, the information may be recorded messages from the user of the DWT 10 or downloaded audio files. The information may be encoded according to any suitable encoding scheme such as, for example, MP3 or ADPCM for audio information, and MPEG, Indeo® or Cinepak® for video information.

Where the information is stored in the memory unit of the DWT 10 in encoded form, the party to whom the information is transmitted should have a decoder capable of decoding the information. According to another embodiment, the call waiting module 60 may re-encode the stored information such that it is encoded according to a suitable format for decoding by the party to whom it is transmitted.

From block 88 the process advances to block 90, where the call waiting module 60 checks for a deactivation command from the user of the DWT 10 terminating the call waiting condition. The call waiting module 60 may detect the deactivation of the call waiting service by the user of the DWT 10 by detecting the depressing of a key on the keyboard 26 indicative of a command to deactivate the service. Typically, such a command may be communicated by depressing, for example, a "SEND", "TRANSMIT", or "FLASH" key on the keyboard 26, depending upon the configuration of the keyboard 26. The microcontroller 18, which is in communication with the keyboard 26 via the I/O interface 30, interprets the depressing of the appropriate key, and communicates its depressing to the call waiting module 60.

As long as the call waiting module 60 does not detect a deactivation command from the user of the DWT 10, the call waiting module 60 may continue to transmit the information to the original call party. However, once the call waiting module 60 detects deactivation of the call waiting service, the call waiting condition no longer exists, and the call waiting module may cease transmitting the stored information.

According to another embodiment, some or all of the modules of the DSP 16 may be included in the microcontroller 18. In addition, according to other embodiments of the present invention, the call waiting module 60 may be implemented in a processing unit of, for example, an analog wireless telephone or a dual-mode digital wireless telephone.

Figure 3:
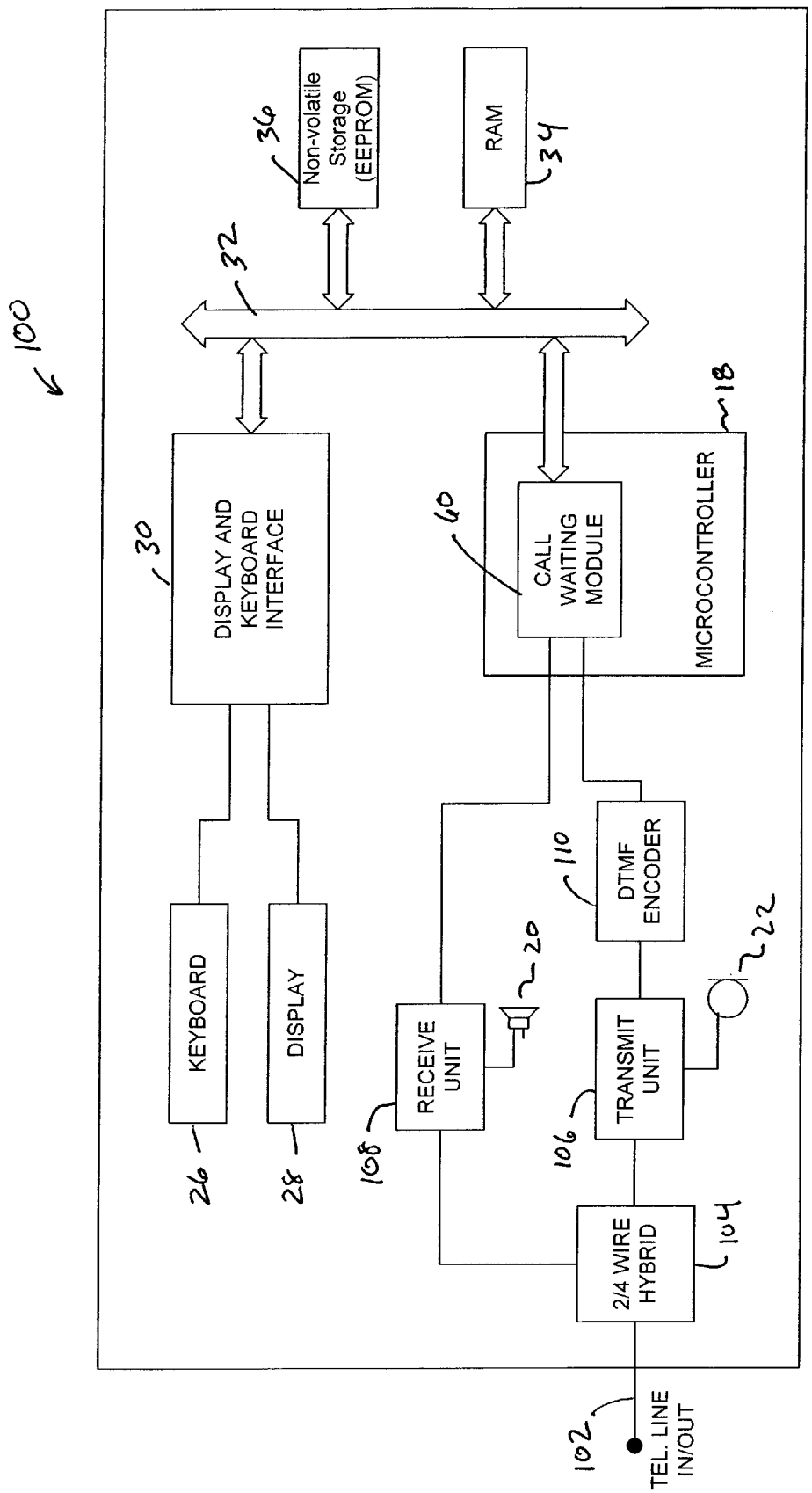
FIG. 3 is a block diagram of a telecommunications device according to another embodiment of the present invention.

The present invention may also be implemented in a wireline telephone. FIG. 3 is a block diagram of a wireline telephone (WLT) 100 according to one such embodiment. The WLT 100 is connected to a telephone line 102 that, in turn, connects the WLT 100 to a telephone switching office as a part of a subscriber loop. The WLT 100 may include a two-to-four wire hybrid (2/4 wire hybrid) 104 that splits the telephone signals in a two-wire system within the WLT 100 into a four-wire system supported by the telephone switching office.

The WLT 100 may include a transmit unit 106 and a receive unit 108. The transmit unit 106 is connected to the telephone line 102 via the hybrid 104, and may include a pulse/tone dialer (not shown) to transmit digits (and/or symbols) dialed by the user with the keyboard 26. The WLT 100 may also include a DTMF (dual tone multi-frequency) encoder 110 to encode digits (and/or symbols) dialed by the user into corresponding DTMF audio tones before they are sent over the telephone line 102 by the tone dialer of the transmit unit 106. The transmit unit 106 may transmit voice received by the microphone 22 over the outgoing telephone line 102. The receiver unit 108 may also be connected to the telephone line 102 via the hybrid 104. The earphone 20 may be connected to the receive unit 108 to provide the user a means to listen to the conversation.

According to one embodiment, the microcontroller 18 may include the call waiting module 60. For the WLT 100, the call waiting module 60 may operate substantially as described previously with respect to the DWT 10 of FIGS. 1 and 2 in providing information to callers put on hold during a call waiting condition.

Figure 4:
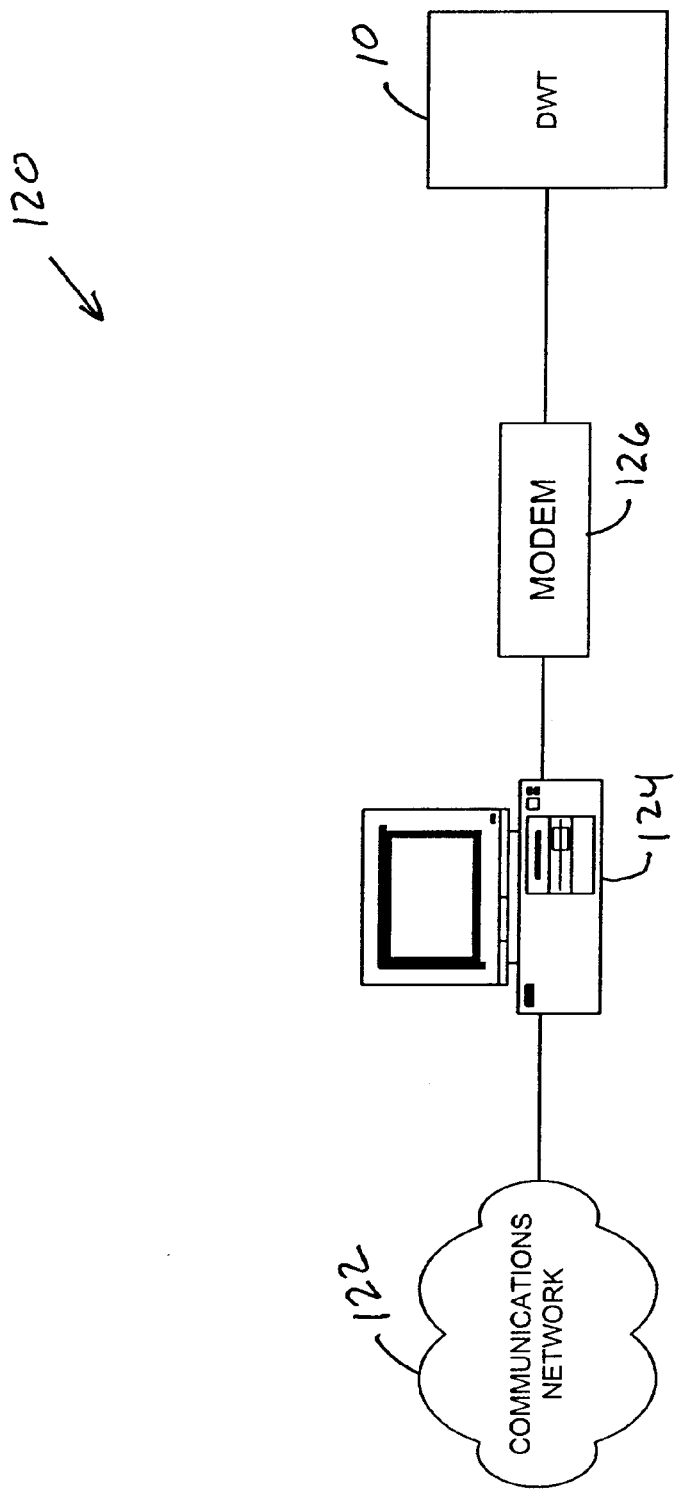
FIG. 4 is a diagram of a system for downloading information according to one embodiment of the present invention.

According to one embodiment, the information stored in one of the memory units may be downloaded to the DWT 10 such as, for example, from a communications network such as, for example, the Internet. FIG. 4 is a block diagram of a system 120 for downloading information from such a network 122 according to one embodiment of the present invention. The system 120 includes a communications device 124 such as, for example, a personal computer (PC), in communication with the network 122. The communications device 124 may establish a connection with the network 122. Information downloaded by the communications device 124 from the network 122 may be downloaded to the DWT 10, via a modem 126 if necessary. The information downloaded by the DWT 10 may be stored in one of the memory units 34, 36 of the DWT 10. Accordingly, the DWT 10 may download information from the Internet for transmission during a call waiting condition. In a similar fashion, a wireline telephone 100 may download information.

According to another embodiment, the information stored in the memory unit of the DWT 10 for transmission during a call waiting condition may be, a message recorded by the user of the DWT 10 via the microphone 22. According to such an embodiment, the user of the DWT 10 may enter a specific code via the keyboard 26, which the DWT 10 may recognize as initiation of a recording. When the user is finished recording the message, the user may enter a second code via the keyboard that is recognized as termination of the recording. According to such an embodiment, the recording may be encoded by the CODEC 24 and stored in one of the memory units 34, 36 for later transmission during a call waiting condition, as described previously herein. In a similar fashion, a wireline telephone 100 of the present invention may allow the user to record messages to be played during the call waiting condition.

Although the present invention has been described herein with respect to certain embodiments, those of ordinary skill in the art will recognize that many modifications and variations of the present invention may be implemented. The foregoing description and the following claims are intended to cover all such modifications and variations.

What is claimed is:

1. A telephone for providing information to a party placed on hold during a call waiting condition, comprising:
    a memory unit, wherein the memory unit is for storing information to be provided to the party placed on hold during the call waiting condition; and
    a call waiting module in communication with the memory unit, wherein the call waiting module is for providing the information to the party placed on hold during the call waiting condition, wherein the telephone is in communication with the party placed on hold via a first communication channel while the telephone is simultaneously in communication with a third party via a second communication channel.

2. The telephone of claim 1, wherein the call waiting module is for transmitting information stored in the memory unit to the party when the call waiting condition is detected.

3. The telephone of claim 2, wherein the call waiting module is further for detecting the call waiting condition.

4. The telephone of claim 3, wherein the call waiting module is for detecting the call waiting condition by detecting a call waiting alert and detecting activation of a call waiting service by a user of the telephone.

5. The telephone of claim 2, wherein the telephone is selected from group consisting of a wireless telephone and a wireline telephone.

6. The telephone of claim 2, wherein the memory unit is a unit selected from the group consisting of a RAM memory unit, a ROM memory unit, and a flash memory unit.

7. A telephone for providing information to a party placed on hold during a call waiting condition, comprising:
    means for storing information to be provided to the party placed on hold during the call waiting condition; and
    means for transmitting the information to the party when the call waiting condition is detected, wherein the telephone is in communication with the party via a first communication channel while the telephone is simultaneously in communication with a third party via a second communication channel.

8. The telephone of claim 7, further comprising means for detecting the call waiting condition.

9. The telephone of claim 8, further comprising means for detecting termination of the call waiting condition.

10. The telephone of claim 7, further comprising means for encoding the information.

11. The telephone of claim 7, wherein the telephone is selected from group consisting of a wireless telephone and a wireline telephone.

12. A method of providing information to a party placed on hold during a call waiting condition, comprising:
    detecting, at a telephone, the call waiting condition; and
    transmitting via a first communication channel, from the telephone, the information to the party when the call waiting condition is detected, while simultaneously maintaining communication with a third party from the telephone via a second communication channel.

13. The method of claim 12, wherein detecting the call waiting condition includes detecting a call waiting alert and detecting activation of a call waiting service.

14. The method of claim 13, further comprising detecting termination of the call waiting condition.

15. The method of claim 14, wherein detecting termination of the call waiting condition includes detecting deactivation of the call waiting service.

16. The method of claim 12, further comprising, downloading the information prior to transmitting the information.

17. The method of claim 12, further comprising encoding the information prior to transmitting the information.

18. The telephone of claim 1, wherein the memory unit is also for downloading the information from a communications network.

19. The telephone of claim 18, wherein the communications network is the Internet.

20. The telephone of claim 1, wherein the information includes an audio file.

21. The telephone of claim 20, wherein the audio file is encoded according to an MP3 format.

22. The telephone of claim 7, further comprising means for downloading the information from a communications network.

23. The telephone of claim 22, wherein the communications network is the Internet.

24. The telephone of claim 7, wherein the information includes an audio file.

25. The telephone of claim 24, wherein the audio file is encoded according to an MP3 format.

26. The method of claim 16, wherein the downloading includes downloading the information from the Internet.

27. The method of claim 12, wherein the information includes an audio file.

28. The method of claim 27, wherein the audio file is encoded according to an MP3 format.

29. A computer readable medium having instructions stored thereon which when executed by a processor, cause the processor to:
    detect, at a telephone, a call waiting condition; and
    transmit via a first communication channel, from the telephone, information to a party placed on hold when the call waiting condition is detected, while simultaneously maintaining communication with a third party from the telephone via a second communication channel.

30. The computer readable medium of claim 29, wherein the instructions, when executed by the processor, further cause the processor to:
    detecting a call waiting alert; and
    detecting activation of a call waiting service.

31. The computer readable medium of claim 30, wherein the instructions, when executed by the processor, further cause the processor to detect termination of the call waiting condition.

32. The computer readable medium of claim 31, wherein the instructions, when executed by the processor, further cause the processor to detect deactivation of the call waiting service.

33. The computer readable medium of claim 29, wherein the instructions, when executed by the processor, further cause the processor to download the information prior to transmission of the information.

34. The computer readable medium of claim 33, wherein the instructions, when executed by the processor, further cause the processor to download the information from the Internet.

35. The computer readable medium of claim 29, wherein the instructions, when executed by the processor, further cause the processor to encode the information prior to transmission of the information.

36. The computer readable medium of claim 29, wherein the instructions, when executed by the processor, further cause the processor to transmit via a first communication channel, from the telephone, an audio file to the party placed on hold when the call waiting condition is detected, while simultaneously maintaining communication with a third party from the telephone via a second communication channel.

37. The method of claim 36, wherein the instructions, when executed by the processor, further cause the processor to encode the audio file according to an MP3 format.

* * * * *